United States Patent [19]
Moore et al.

[11] 3,800,779
[45] Apr. 2, 1974

[54] MELT CYCLE CONTROL SYSTEM

[75] Inventors: Lewis Frank Moore; George McNair Price, both of Shreveport, La.

[73] Assignee: The Frymaster Corporation, Shreveport, La.

[22] Filed: Feb. 5, 1973

[21] Appl. No.: 329,377

[52] U.S. Cl. .................................. 126/374, 99/333
[51] Int. Cl. ........................ A47j 37/12, A47j 36/32
[58] Field of Search ............. 126/351, 374, 343.5, ; 236/20; 99/403, 332, 333; 219/421

[56] References Cited
UNITED STATES PATENTS

| | | | |
|---|---|---|---|
| 3,559,564 | 2/1971 | Turner et al. | 219/354 X |
| 3,626,155 | 12/1971 | Joeckel | 219/411 |
| 3,470,942 | 10/1969 | Fukada et al. | 219/10.55 X |
| 3,217,633 | 1/1965 | Anetsberger | 99/403 X |
| 2,569,112 | 9/1951 | Miller et al. | 126/345 X |

*Primary Examiner*—William F. O'Dea
*Assistant Examiner*—William C. Anderson

[57] ABSTRACT

A system for controlling and regulating heat input to a commercial frypot during the melting of solid shortening in the frypot comprises a timer motor which operates through a by-pass switch to cyclically enable and disable the burners of the frypot. A melt thermostat is responsive to the presence of warm liquid shortening at a predetermined level in the frypot, and upon actuation functions to automatically transfer control over the operation of the frypot to conventional instrumentalities, such as a high limit thermostat and an operating thermostat.

10 Claims, 2 Drawing Figures

MELT CYCLE CONTROL SYSTEM

BACKGROUND AND SUMMARY OF THE INVENTION

This invention relates to a melt cycle control system, and more particularly to a system for regulating heat input to a commercial frypot during the melting of solid shortening in the frypot.

At the present time it is common practice to pack a commercial frypot with solid shortening prior to operating a gas burner or electric heating element associated with the frypot to melt the shortening. This is a troublesome and time consuming task, but has heretofore been necessary for at least two reasons. First, the shortening in the frypot acts as a heat sink tending to maintain all of the component parts of the frypot at a uniform temperature. Conversely, if any part of the frypot does not contain shortening, thermal stresses can be established in the frypot and can reach such a magnitude that the frypot is warped or otherwise permanently damaged. Perhaps mroe importantly, any portion of the frypot which is not in direct contact with shortening tends to develop as a "hot spot." This causes scorching as the solid shortening melts and the liquid shortening engages the hot spots.

The present invention comprises a melt cycle control system which overcomes the foregoing difficulties. In accordance with the broader aspects of the invention, a gas burner or an electric heating element associated with a frypot is cyclically enabled and disabled during the melting of solid shortening in the frypot. In this manner the heat input to the frypot is regulated, which in turn assures the safe melting of the solid shortening.

In accordance with more specific aspects of the invention, the frypot is provided with a melt thermostat which is responsive to the presence of warm liquid shortening at a predetermined level in the frypot. The melt thermostat initially actuates a timer motor which functions to cyclically actuate a by-pass switch, thereby cyclically enabling and disabling the gas burner or the electric heating element of the frypot. As soon as the solid shortening in the frypot has melted, warm liquid shortening is detected by the melt thermostat. The melt thermostat thereupon functions to disable the timer motor, whereby the regulation of the heat input to the frypot is automatically transferred to conventional instrumentalities, such as a high limit thermostat and an operating thermostat.

DESCRIPTION OF THE DRAWINGS

A more complete understanding of the invention may be had by referring to the following Detailed Description when taken in conjunction with the accompanying Drawings, wherein.

DETAILED DESCRIPTION

Figure 1:
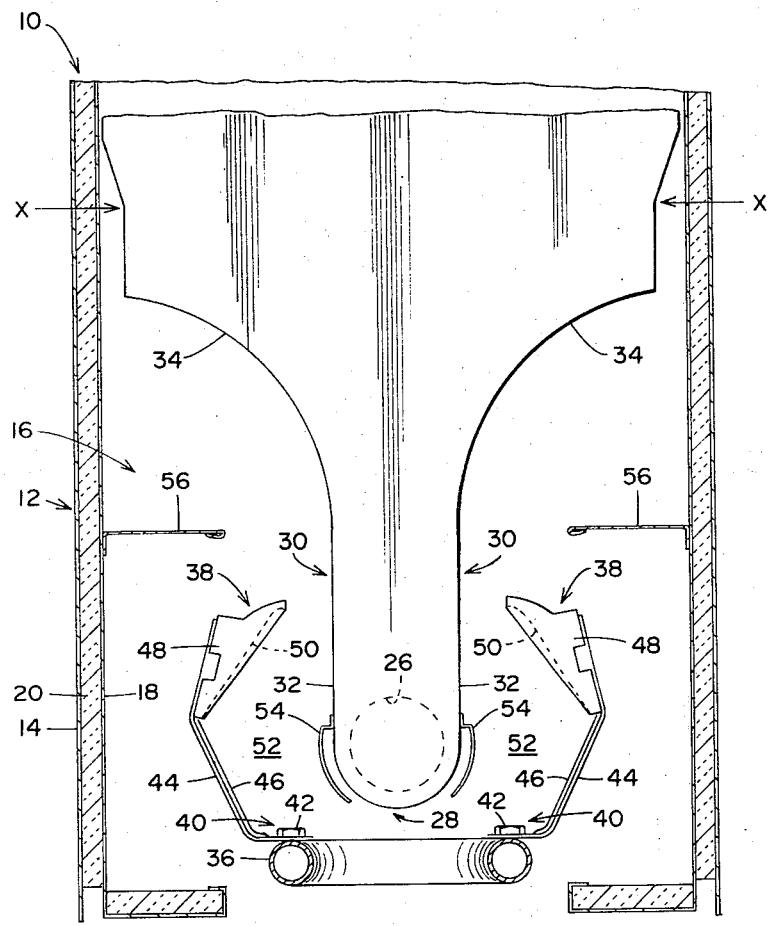
FIG. 1 is an illustration of a cooking system utilizing the invention.

Referring now to the Drawings, and particularly to FIG. 1, there is shown a cooking system 10 which may be utilized in the practice of the present invention. The cooking system 10 includes a housing 12 comprising outer panels 14 which may be formed from stainless steel or the like. The housing 12 defines a firebox 16 comprising inner panels 18. The panels 18 are separated from the panels 14 by thermal insulation layers 20 and support inwardly projecting members 22. The members 22 provide both thermal and acoustical insulation and serve to control air flow into the firebox 16.

A frypot 24 is mounted within the firebox 16 of the housing 12 and includes a pair of vertically disposed end walls one of which is provided with a drain 26. The bottom portion 28 of the frypot 24 is semicylindrical in shape and is concentric with the drain 26. A pair of heat transfer walls 30 extend generally upwardly and outwardly from the semicylindrical bottom portion 28. Each heat transfer wall 30 includes a lower vertically extending portion 32 and an upper outwardly curved portion 34. The shape of the outwardly curved portions 34 of the walls 30 is important in that it assures the flow of breading particles and other wastes and residues into the bottom portion 28 of the frypot 24.

Another important feature of the frypot 24 comprises the spacing of the heat transfer walls 30. The walls 30 are purposely separated by a sufficient distance to permit an adult hand to be fully inserted into the bottom portion 28 of the frypot 24. This greatly simplifies the cleaning of the frypot 24 and thereby materially reduces the amount of time that the frypot must be out of service in order to permit cleaning.

A gas supply manifold 36 is also mounted in the firebox 16 of the housing 12 of the cooking system 10. The manifold 36 is supported by brackets which depend from the frypot 24. Suitable fuel for the cooking system 10, such as natural gas, propane, LP gas, etc. is admitted to the cooking system 10 from a source through a suitable inlet and the manifold 36.

The gas supply manifold 36 supports a plurality of burners 38. The burners 38 are positioned at spaced points along the manifold 36 adjacent the heat transfer walls 30 and the end walls of the frypot 24, and function to heat the contents of the frypot. Each burner 38 includes a pair of orifices 40 which are threadably engaged wih the gas supply manifold 36. Each orifice 40 comprises a relatively large diameter inlet bore tapering to a relatively small diameter outlet orifice 42 formed at the upper end. Thus, during the operation of the cooking system 10, gas flows out of each orifice 40 in the form of a relatively small diameter, relatively high velocity jet.

The two orifices 40 of each burner 38 support a bracket 44. The bracket 44 typically comprises bifurcated or multifurcated portions which receive the orifices 40 and are thereby secured to the manifold 36. Each bracket 44 extends generally upwardly from its associated pair of orifices and includes a reinforcing rib 46 which prevents warping of the bracket due to extended exposure to elevated temperatures.

The brackets 44 in turn support targets 48 which are preferably formed from a ceramic or other heat resistant material. Each target 48 includes a face 50 extending at an angle relative to the vertical and having a plurality of inwardly facing projections formed on it. The face 50 of each target 48 comprises a substantially planar surface facing generally both towards its associated gas jets and towards the frypot 24.

During operation of the cooking system 10, gas is discharged from the orifices 40 of the burners 38 in the undiluted state. That is, primary air is not mixed with the gas prior to discharge of the gas for combustion.

This is important because it eliminates the problem of clogging of the usual air shutters and venturi throats due to lint or other foreign matter that is often carried into gas stream with the primary air. This in turn assures a proper gas/air mixture and associated efficient and safe combustion, and thereby eliminates a serious maintenance problem that is frequently encountered in the use of gas burners.

The housing 12 of the cooking system 10 is adapted to admit ambient or secondary air to the vicinity of the burners 38. The orifices 40 of each burner 38 in the cooking system 10 are positioned closely adjacent one another so that some of the gas of each jet of each burner together with air entrained therein intersects with some of the gas/air mixture in an adjacent jet. This causes turbulent intermixing of the gas and the secondary air. Also, the target 48 of each burner 38 extends partially into the path of the jets of the burner, and therefore deflects the jets towards the frypot 24 to cause further turbulent intermixing of the gas and the secondary air. By this means gas from the jets is thoroughly intermixed with the secondary air to form a combustible mixture.

Combustion of the gas and air mixture occurs in a combustion zone 52 located adjacent the vertically extending portions of the heat transfer walls 30 of the frypot 24. The positioning of the orifices 40 of the burners 38, the inward deflection of the jets caused by the positioning of the targets 48, and the shape of the heat transfer walls 30 of the frypot 24 cooperate to cause heated products of combustion to travel upwardly along the vertically extending portions and along the outwardly extending portions of the heat transfer walls 30. The products of combustion then flow out of the cooking system 10 through a flue. Combustion in the cooking system 10 is further characterized by the reflection of heat from the targets 48 into the combustion zones 52. This phenomenon has been found to markedly increase the efficiency of the cooking system 10.

The frypot 24 may also be equipped with a pair of baffles 54 mounted on the heat transfer walls 30 at points just below the vertically extending lower portions 32. The baffles 54 serve to retard heat transfer from the combustion zone 52 into the lower portion of the frypot 24 and thereby establish a relatively cool zone in the bottom of the frypot. This is advantageous in that it removes the cooking fluid in the lower portion of the frypot from circulation caused by natural convection, and therefore allows breading particles and other wastes and residues to settle into the bottom of the frypot without being recycled into the upper portion thereof.

The cooking system 10 further includes a pair of baffles 56 which extend inwardly from the inner panels 18 comprising the firebox 16. The baffles 56 are positioned above the combustion zone 52 and below the outwardly extending portions 34 of the heat transfer walls 30. The baffles 56 are therefore positioned at points adjacent the paths of the products of combustion upwardly along the walls 30 and therefore serve to prevent recycling of the products of combustion into the combustion zone 52.

In the use of the cooking system 10, the frypot 24 is initially filled with shortening, particularly solid shortening. The burners 38 are then operated to melt the solid shortening and to preheat the resulting liquid shortening to a cooking temperature. Thereafter, the cooking system 10 is utilized in the conventional manner to cook foods, which may include frozen foods and refrigerated foods. A more complete understanding of the construction and operation of the cooking system 10 may be had by referring to the co-pending application of Lewis Frank Moore and George McNair Price, filed Feb. 4th, 1972, Ser. No. 223,443, for COOKING SYSTEM, the disclosure of which is incorporated herein by reference.

Figure 2:
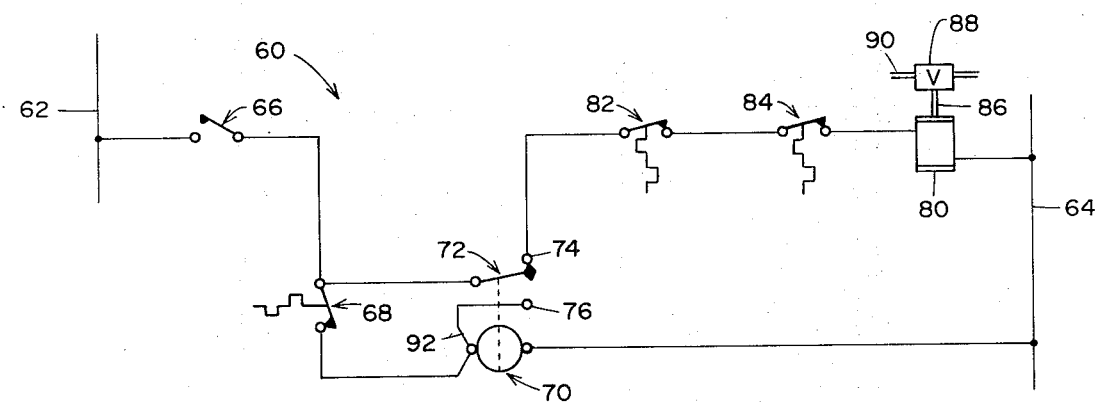
FIG. 2 is a schematic illustration of a melt cycle control system incorporating the invention.

Referring now to FIG. 2, there is shown a melt cycle control system 60 useful in conjunction with cooking systems such as that shown in FIG. 1 and similar cooking systems to regulate the operation of the burners, particularly during the melting of the solid shortening in the frypot. A suitable operating potential, for example, conventional 115 volt, 60 hz line current, is applied across a pair of leads 62 and 64. Upon closure of an off-on switch 66, current is directed through an initally closed melt thermostat 68 to a timer motor 70. The timer motor 70 produces an output which is mechanically coupled to a by-pass switch 72. The by-pass switch 72 is adapted to contact either a terminal 74 or a terminal 76.

Whenever the by-pass switch 72 contacts the terminal 74, a solenoid 80 is energized through a conventional high limit thermostat 82 and a conventional operating thermostat 84. The solenoid 80 includes a plunger 86 which is mechanically coupled to a valve 88 which controls the flow of gas through a passageway 90 extending to gas burners of the cooking system. Therefore, whenever the solenoid 80 is acutated, the valve 88 is opened and gas is permitted to flow to the burners of the cooking system. The burners function to burn the gas, whereby heat is directed into the frypot of the cooking system to melt the solid shortening therein.

On the other hand, whenever the switch 72 contacts the terminal 76 the circuit path to the solenoid 80 is broken. The solenoid 80 is therefore de-energized and the valve 88 is closed. This terminates the flow of gas to the burners of the cooking system, which in turn terminates the heat input to the frypot of the cooking system. It will be appreciated that as soon as the timer motor 70 functions to re-engage the switch 72 with the terminal 74, operation of the burners is re-initiated, whereupon further heat is directed to the frypot.

The timer motor 70 and the by-pass switch 72 are preferably so interrelated that the switch 72 operates in the manner of a toggle or flip-flop. That is, the component parts of the melt cycle control system 60 are preferably so related that the switch 72 is continuously engaged either with the terminal 74 or the terminal 76. Furthermore, the timer motor 70 is preferably so constructed that the overall duration of the operating cycle of the melt cycle control system and the percentage of each cycle during which the switch 72 is engaged with the terminal 74 are independently adjustable, thereby providing complete control over the heat input to the frypot of the cooking system. It has been found that in most instances it is necessary to engage the switch 72 with the terminal 74 and hence to operate the burners of the cooking system for only a small proportion of the time during which the switch 72 is engaged with the terminal 76 and the burners of the cooking system are therefore de-energized. For example, in one system the switch 72 was engaged with the terminal 74 for about 12 ½ percent of the total cycle corresponding to a maximum operating time of the burners of about 5 ½ seconds.

Upon continued cyclical operation of the burners of the cooking system as controlled by the timer motor 70 and the by-pass switch 72, the solid shortening in the frypot of the cooking system is eventually melted. That is, the melt cycle control system 60 operates the burners of the cooking system to gradually and safely melt the solid shortening within the frypot, whereby the frypot gradually becomes filled with warm liquid shortening. The melt thermostat 68 is responsive to the presence of warm liquid shortening at a predetermined level within the frypot of the cooking system, for example, the level indicated by the point X in FIG. 1.

Upon sensing warm liquid shortening at the predetermined level, the melt thermostat 68 functions to open the circuit path to the timer motor 70. If the melt thermostat 68 opens when the timer motor 70 has positioned the by-pass switch 72 in engagement with the terminal 74, operation of the cooking system is immediately continued under the control of the high limit thermostat 82 and the operating thermostat 84. On the other hand, if the melt thermostat 68 opens when the timer motor 70 has engaged the by-pass switch 72 with the terminal 76, operation of the timer motor 70 is continued throughout the remainder of the cycle in progress by means of a lead 92 extending from the terminal 76 to the timer motor 70. Upon completion of such a previously initiated operating cycle, the timer motor 70 engages the by-pass switch 72 with the terminal 74, whereupon operation of the cooking system continues under the control of the high limit thermostat 82 and the operating thermostat 84.

The present invention has been described in conjunction with a gas fired cooking system. However, as will be appreciated by those skilled in the art, the invention is equally applicable to electrically heated cooking systems. In such an instance the solenoid 80 is simply replaced with a relay which functions to control the flow of electric current to the heating elements of the system. No further change in the melt cycle control system 60 is necessary.

As has been indicated previously, the conventional practice in the operation of a cooking system is to completely pack the frypot of the system with solid shortening prior to operating the gas burner or the electric heating elements of the system to melt the shortening. This has heretofore been necessary for two reasons. First, if solid shortening did not cover substantially the entire heat transfer surfaces of the frypot, hot spots would develop. Then, as the solid shortening melted, the liquid shortening contacting such a hot spot would be scorched. Second, the shortening within the frypot acts as a heat sink tending to maintain the various component parts of the frypot at substantially the same temperature. Therefore, if portions of the frypot were not filled with shortening, the temperature of such portions could reach such a high level that the component parts of the frypot were warped or otherwise damaged to thermal stress.

In the use of the present system, the necessity of packing the frypot with shortening is completely eliminated. Quite to the contrary, it is simply necessary to fill the frypot of the cooking system with a sufficient quantity of solid shortening. This may be done by means of blocks of solid shortening, or in any other convenient manner.

Upon inititation of the operation of a melt cycle control system incorporating the invention, the burners of the cooking system are cyclically operated to cause heat flow into the frypot of the system, thereby melting the solid shortening. However, the duration of operation of the burners is so limited that the heat input to the frypot is not excessive. Thus, both the possibility of the development of hot spots which scorch the liquid shortening and the possibility of damage to the component parts of the frypot due to thermal stress are completely eliminated.

Those skilled in the art will appreciate the fact that various alternatives to the basic embodiment of the invention shown in the drawings are possible. Perhaps most importantly, it will be understood that the function of the melt thermostat 68 is to sense the presence of liquid shortening at a predetermined level within the frypot 24. The use of a thermostat to perform this function has been found to be both economical and highly reliable. However, optical and/or other transducers can also be used to sense the level of liquid shortening within the frypot. In the case of such a substitution, the basic operation of the system is not changed.

Although preferred embodiments of the invention have been illustrated in the accompanying Drawings and described in the foregoing Detailed Description, it will be understood that the invention is not limited to the embodiments disclosed, but is capable of numerous arrangements, modifications, and substitutions of parts and elements without departing from the spirit of the invention.

What is claimed is:

1. In a cooking system of the type comprising a frypot adapted to receive solid shortening, apparatus for heating the frypot and thereby initially melting the solid shortening and then heating the resulting liquid shortening to a cooking temperature, and an operating thermostat for operating the heating apparatus to maintain the liquid shortening at the cooking temperature, a melt cycle control system comprising:

means for cyclically actuating the heating apparatus of the cooking system for a first predetermined period of time and then de-actuating the heating apparatus for a second predetermined period of time and thereby regulating the rate of heat input to the frypot; and means responsive to the presence of warm liquid shortening at a predetermined level in the frypot for disabling the cyclically operating means and for automatically transferring control over the operation of the heating apparatus to the operating thermostat.

2. The melt cycle control system according to claim 1 wherein the cyclically operating means comprises a timer motor and first switch means operated by the timer motor between two conditions, one corresponding to actuation of the heating apparatus of the cooking system and the other corresponding to de-actuation of the heating apparatus.

3. The melt cycle control system according to claim 2 wherein the warm liquid shortening responsive means comprises second switch means mounted at a predetermined location in the cooking system and connected in series with the timer motor so that the timer motor is operated whenever the second switch means fails to detect the presence of warm liquid shortening at the predetermined location in the cooking system and is disabled whenever the second switch means detects the presence of warm liquid shortening at the predetermined location.

4. The melt cycle control system according to claim 3 wherein the switch means driven by the timer motor is connected in parallel with the timer motor and further including means for energizing the timer motor through the first switch means in the event the first switch means is operated to de-actuate the heating means when the second switch means is opened and thereby permitting the timer motor to complete a previously initiated cycle of operation.

5. A cooking system comprising:
a frypot adapted to receive shortening in solid form;

means for heating the frypot to initially melt the shortening and thereafter to heat the shortening to a predetermined cooking temperature;

means for normally operating the heating means to maintain said predetermined cooking temperature within the shortening in the frypot;

means connected in series with said normal operating means for cyclically actuating said heating means for a first predetermined period of time and then de-actuating the heating means for a second predetermined period of time and thereby melting the solid shortening within the frypot; and switch means responsive to the presence of warm liquid shortening at a predetermined level within the frypot for disabling the cyclically operating means and automatically transferring control over the operation of the heating means to the normal operating means.

6. The cooking system according to claim 5 further characterized by:

electrically actuated means for controlling the operation of the heating means;

by-pass switch means for controlling the flow of operating current to the electrically actuated means; and timer means connected in series with the first switch means for cyclically operating the by-pass switch means.

7. The cooking system according to claim 6 wherein the timer means comprises a timer motor mechanically coupled to the by-pass switch means and further including means interconnecting the by-pass switch means and the timer motor for causing the timer motor to complete a previously initiated cycle of operation notwithstanding the actuation of the first switch means in response to the presence of warm liquid shortening in the frypot.

8. The cooking system according to claim 7 wherein the heating means comprises at least one gas burner adapted for combustion in a zone adjacent the frypot to cause heating of the frypot and the shortening therein and wherein the electrically operated means comprises a solenoid operated valve for controlling the flow of gas to the gas burner.

9. A cooking system comprising:
a frypot adapted to receive solid shortening and including upwardly and outwardly extending heat transfer walls;

a plurality of gas burners positioned to cause combustion in a zone adjacent the heat transfer walls of the frypot whereby the solid shortening in the frypot is initially melted and is thereafter heated to a predetermined cooking temperature;

electrically operated means for controlling the flow of gas to the gas burners;

operating thermostat means connected in series with the electrically operated means for actuating the gas burners to maintain a predetermined cooking temperature within the shortening in the frypot;

by-pass switch means connected in series with the operating thermostat means and the electrically operated means for controlling the flow of current therethrough;

timing means adapted to cyclically actuate the by-pass switch means to direct operating current through the operating thermostat means and the electrically operated means for a first predetermined period of time and then to prevent the flow of operating current through the operating thermostat means and the electrically operated means for a second predetermined period of time, whereby the gas burners are cyclically operated to gradually heat the frypot and thereby safely melt the solid shortening therein; and melt thermostat means responsive to the presence of warm liquid shortening at a predetermined level within the frypot for disabling the timing means, whereby the operation of the gas burners is automatically placed under the control of the operating thermostat means.

10. The cooking system according to claim 9 wherein the timing means comprises a timer motor connected in series with the thermostat switch means and in parallel with the by-pass switch means and further including means for automatically actuating the by-pass switch means to direct operating current through the operating thermostat means and the electrically operated means regardless of the condition of the by-pass switch means when the melt thermostat means is acutated in response to the presence of warm liquid shortening in the frypot.

* * * * *